(12) United States Patent
Koren

(10) Patent No.: US 7,233,016 B2
(45) Date of Patent: Jun. 19, 2007

(54) METHODS AND APPARATUS FOR PULSED RADIATION IMAGE ACQUISITION

(75) Inventor: Jacob Koren, Haifa (IL)

(73) Assignee: Orex Computed Radiography Ltd., Yokneam (IL)

(*) Notice: Subject to any disclaimer, the term of this patent is extended or adjusted under 35 U.S.C. 154(b) by 102 days.

(21) Appl. No.: 11/018,385

(22) Filed: Dec. 20, 2004

(65) Prior Publication Data

US 2005/0230648 A1 Oct. 20, 2005

Related U.S. Application Data

(60) Provisional application No. 60/531,026, filed on Dec. 19, 2003.

(51) Int. Cl.
*G01N 23/04* (2006.01)
*G03B 42/08* (2006.01)

(52) U.S. Cl. .................. 250/584; 250/585

(58) Field of Classification Search ............ 250/584, 250/585
See application file for complete search history.

(56) References Cited

U.S. PATENT DOCUMENTS

| 5,109,297 A | * | 4/1992 | Izumi ............... 359/216 |
| 6,291,831 B1 | | 9/2001 | Koren |
| 2002/0139945 A1 | * | 10/2002 | Takahashi et al. ...... 250/584 |

* cited by examiner

*Primary Examiner*—David Porta
*Assistant Examiner*—Mindy Vu

(57) ABSTRACT

A method of acquiring at least one image from an image recording medium using a pulsed radiation source is provided. In one aspect, a method of scanning an image recording medium that has been exposed to X-ray radiation comprises providing first radiation along a plurality of scan traces over a surface of the image recording medium such that the first radiation does not impinge on the image recording over at least one interval along each of the plurality of scan traces. The pulsed laser source may reduce and/or eliminate cross-influence artifacts in images resulting from pulsed radiation image acquisition.

25 Claims, 8 Drawing Sheets

METHODS AND APPARATUS FOR PULSED RADIATION IMAGE ACQUISITION

RELATED APPLICATION

This application claims priority under 35 U.S.C. § 119(e) to U.S. Provisional Application Ser. No. 60/531,026, entitled "IMAGE ACQUISITION METHOD AND APPARATUS USING A PULSED RADIATION SOURCE," filed on Dec. 19, 2003, which is herein incorporated by reference in its entirety.

FIELD OF THE INVENTION

The present invention relates to image acquisition devices such as computer radiography (CR) image readers. More particularly, the present invention relates to image readers adapted to scan phosphor plates having been exposed to X-ray radiation in order to obtain a latent image stored thereon.

BACKGROUND OF THE INVENTION

X-ray imaging technology provides a non-invasive technique for visualizing the internal structure of an object of interest by exposing the object to high energy electromagnetic radiation (i.e., X-rays). X-rays emitted from a radiation source pass through the object and are absorbed at varying levels by the internal structures of the object. As a result, X-ray radiation exiting the object is attenuated according to the various absorption characteristics of the materials which the X-rays encounter.

The absorption characteristics of the object of interest may be captured by placing the object between a high energy electromagnetic radiation source and an image recording medium. As radiation from the source passes through the object, the radiation impinges on the image recording medium with an intensity related to the attenuation caused by the different absorption characteristics of the object. The impinging radiation causes a change in the image recording medium that is proportional to the radiation intensity, thereby storing information about the internal structure of the object. The image recording medium may then be processed to recover the stored information by, for instance, converting it into digital form. Common types of image recording media include sheet film, phosphor media, etc.

Phosphor plate or screen technology has emerged as a valuable image recording media for computed radiography (CR). When electromagnetic radiation, such as X-ray radiation, impinges on a phosphor plate, the radiation interacts with the phosphor lattice of the plate. The phosphor molecules in the plate store energy proportional to the intensity of the impinging radiation. This energy can later be released by scanning the plate with a laser to excite the phosphors in the plate (i.e., by causing the phosphor molecules to fluoresce). The excited phosphor molecules release radiation that can be detected, quantified and stored as values representing pixels in an image. Apparatus adapted to releasing and detecting information from phosphor plates are often referred to as computed radiography (CR) scanners, CR image readers, or more generally referred to as CR systems.

The radiation provided to obtain information from an image recording medium is referred to as "stimulating radiation" and describes any electromagnetic radiation capable of exciting an image recording medium. In the context of CR systems, stimulating radiation is commonly provided as a laser having power and frequency characteristics capable of exciting phosphor molecules in a phosphor plate. The stimulating radiation is typically provided to the image recording medium in a generally planned path. This process is referred to herein as "scanning." One method of scanning includes logically dividing an area of an image recording medium into a plurality of pixel regions. Each pixel region may correspond to a pixel in a resulting image acquired from the medium. For example, FIGS. 1A and 1B illustrate a portion of an image recording medium 100 divided into a regular Cartesian grid 10 (denoted by the dotted lines) labeled as A–F on the y-axis and 1–6 on the x-axis, the grid forming a plurality of rectangular pixel regions.

An image typically represents intensity as a function of space. The term "intensity" refers generally to a magnitude, degree and/or value at some location in the image. For example, in an X-ray image, the pixel intensity generally represents the absorption characteristics of scanned material at a particular location in space and may be related, among other characteristics, to the density of the material. An image may be formed by assigning an intensity value to each of the pixel regions logically assigned to an image recording medium. For example, where the image recording medium (e.g., medium 100) is a phosphor plate, an intensity value may be assigned to each pixel region based on the amount of photonic energy assumed to have been released from phosphor molecules located within the respective pixel region in response to stimulating radiation applied during scanning.

Two examples of a scanning path along grid 10 include raster XY and raster YX order. In raster YX order illustrated in FIG. 1A, the scanner traverses the grid across the domain of the y-axis in a direction from A to F while holding the x-coordinate constant, thus scanning along a vertical scan trace, for example, scan trace 15a. The x-coordinate may then be incremented and the y domain scanned again along the next scan trace 15b. This process may be repeated until a desired area of the image recording medium has been traversed. Similarly, a raster XY scan (illustrated in FIG. 1B) traverses the grid across the x-domain and then increments the y-coordinate as indicated by horizontal scan traces 15a′–15f′.

The term scan trace (or simply trace) refers to a path over a surface or portion of an image recording medium. A scan trace may be a path that varies over a range of a first dimension of an image recording medium while remaining substantially constant over another dimension, or may vary simultaneously over more than one dimension of the image recording medium. Image information obtained from applying radiation along a scan trace may correspond to a plurality of pixel intensities over one dimension of the resulting image. For example, image information obtained along a scan trace may correspond to a single complete row or column of pixels in an image. However, image information obtained along some scan traces (e.g., a helical scan trace) may correspond to more than one row or column of pixels. A scan trace may be a line (e.g., scan traces 15a–15b in FIG. 1), an arc (e.g., as described in detail in connection with FIG. 7), a helix or any other suitable path over the surface of an image recording medium.

The resolution of an image obtained from an image recording medium may depend in part on a scanners ability to excite intended regions of an image recording medium in isolation, and then to resolve the location from where detected energy was released. In general, the smaller the region that can be stimulated in isolation and detected, the greater the resolution of the resulting image. Accordingly, the dimensions of a pixel region (e.g., a pixel width and a pixel length) of the logical grid applied to the image recording medium is inversely related to the resolution.

CR image readers often employ a laser beam to excite regions of a phosphor plate that have been exposed to X-ray radiation. Conventional image readers typically provide the laser over a range of a first dimension of the phosphor plate in a continuous fashion. For example, a laser beam may be applied continuously along the y-axis in a raster YX scan along an essentially linear scan trace. The photons released by the phosphors in the plate may then be detected, for example, by a photomultiplier tube and converted into a portion of a digital image. The laser may then be translated by one pixel width over a second dimension (e.g., the x-axis in a raster YX scan) and traversed along a subsequent scan trace. Since the phosphor plate is stimulated along a trace in a continuous fashion, the photons emitted from the phosphor plate along a scan line will be released in a substantially continuous fashion. A detector adapted to sense the emitted photons, therefore, will respond with a generally continuous output, referred to as a detection signal. That is, detection signals generated by a detector in conventional CR systems will be continuous in nature. The generally continuous detection signals must then be digitized to form the individual pixels in the image. This may be achieved in a number of ways including integrating the continuous signal over predetermined intervals, sampling the continuous signals at a predetermined sampling interval, etc. The value obtained by processing the detection signals may then be converted to a digital number representing the corresponding density as a brightness value in some desired range suitable for display.

SUMMARY OF THE INVENTION

One embodiment according to the present invention includes a method of scanning an image recording medium that has been exposed to X-ray radiation, the method comprising an act of providing first radiation along a plurality of scan traces over a surface of the image recording medium such that the first radiation does not impinge on the image recording over at least one interval along each of the plurality of scan traces.

Another embodiment according to the present invention includes an image acquisition apparatus comprising a radiation source adapted to provide first radiation, a support adapted to position an image recording medium in a proximate relationship with the radiation source, and at least one controller coupled to the radiation source, the at least one controller adapted to control the radiation source such that the first radiation is provided to the image recording medium along a plurality of scan traces such that the first radiation does not impinge on the image recording medium over at least one interval along each of the plurality of scan traces.

Another embodiment according to the present invention includes a method of acquiring an image from an image recording medium, the method comprising acts of providing first radiation over a portion of an image recording medium along a plurality of scan traces, the first radiation provided along each of the plurality of scan traces such that it alternately is caused to impinge on the image recording medium during on intervals and prevented from impinging on the image recording medium during off intervals, detecting second radiation emitted from the image recording medium in response to the first radiation provided along each of the plurality of scan traces to produce a respective plurality of detection signals, and converting each of the plurality of detection signals into a plurality of discrete pixel intensities to form the image, wherein each portion of the plurality of detection signals corresponding to an on interval is respectively converted to a single discrete pixel intensity.

Another embodiment according to the present invention includes an image acquisition apparatus comprising a radiation source adapted to provide first radiation to an image recording medium, the radiation source configured to be pulsed, in alternation, between an on interval and an off interval along a plurality of scan traces, a detector adapted to detect second radiation emitted from the image recording medium in response to the first radiation, the detector configured to provide a plurality of detection signals corresponding to scanning along each of the plurality of scan traces, respectively, and circuitry coupled to the detector, the circuitry adapted to convert each of the plurality of detection signals into a plurality of pixel intensities such that each portion of the plurality of detection signals resulting from on intervals is converted into a single respective pixel intensity.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION

The resolution and quality of an image acquired from scanning an image recording medium may be effected by various factors including physical limitations of the equipment, for example, the size of a focal spot of stimulating radiation that may be produced, errors resulting from the methods by which the image was acquired and detected, conversion of detection signals into discrete pixel values, etc.

Figure 1A:
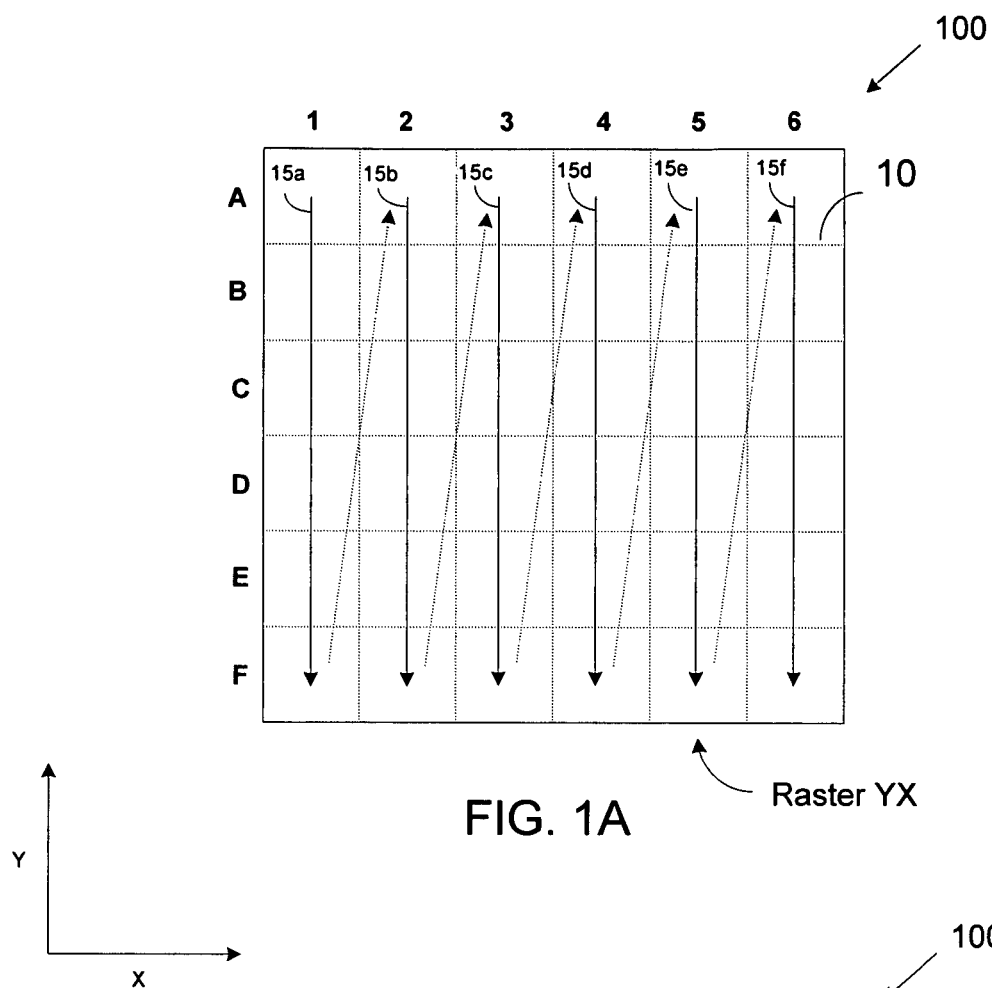
FIGS. 1A and 1B illustrate a portion of an image recording medium.
Figure 1B:
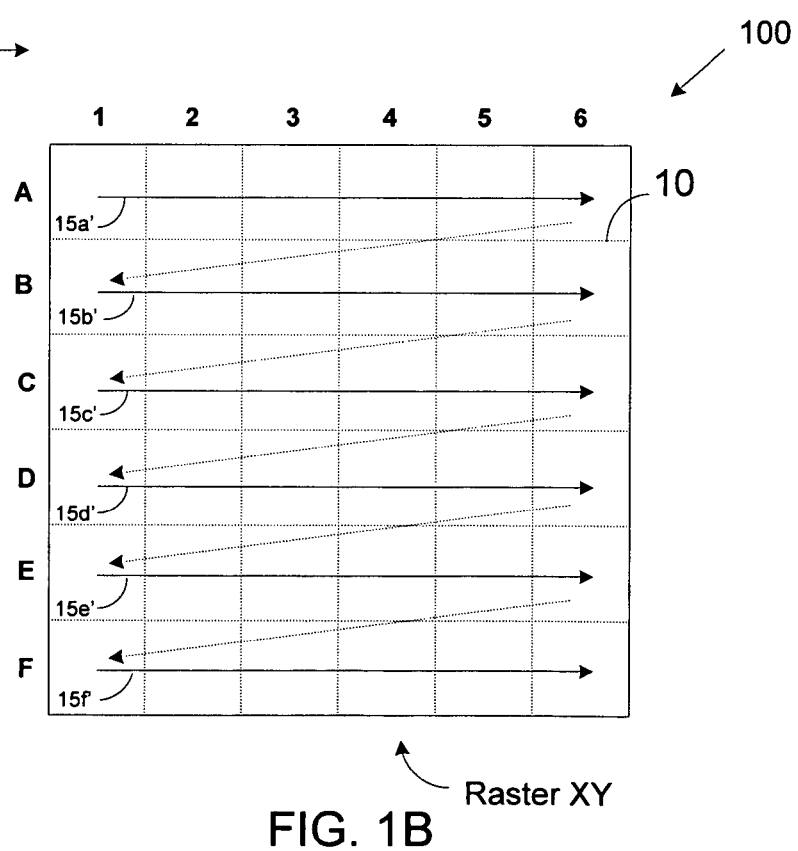
Figure 2A:
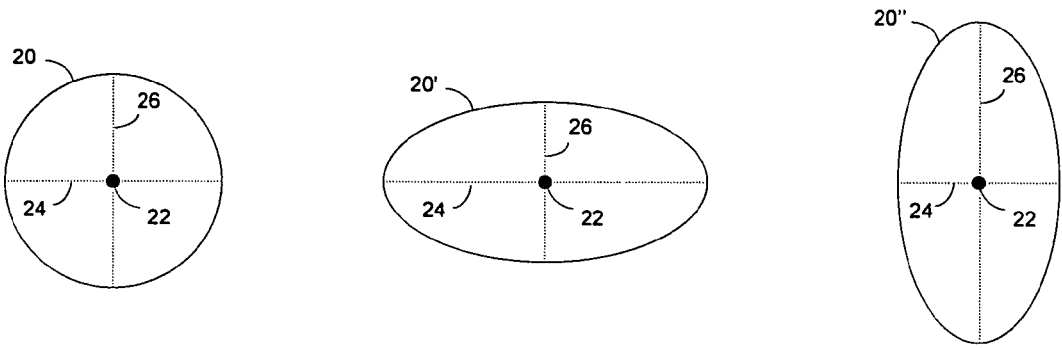
FIGS. 2A and 2B illustrate various physical characteristics of an example of stimulating radiation in the form of a laser beam.
Figure 2B:
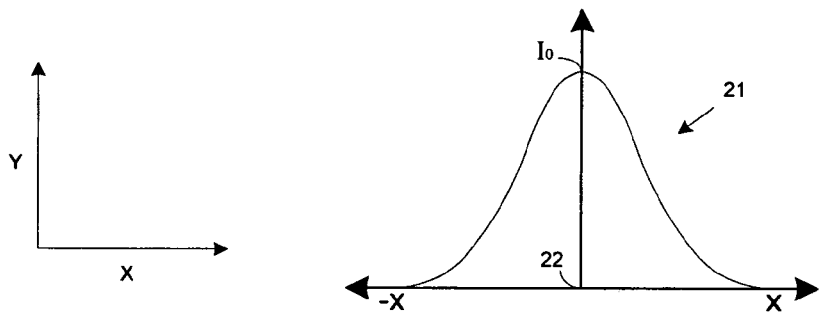

FIGS. 2A and 2B illustrate various physical characteristics of one example of stimulating radiation in the form of a laser beam. A laser beam may have a cross-section that is generally elliptical in shape, for example, the characteristic shapes illustrated by focal spot 20, 20' and 20". A generally elliptical focal spot may be characterized by a center 22, major axis 24 and minor axis 26. The term "focal spot" refers generally to a cross-section or area of radiation emitted from a radiation source wherein the intensity of the radiation is non-negligible. In particular, the focal spot refers generally to the boundary of radiation impinging on an image recording medium within which the intensity is sufficient to release energy stored in the phosphor lattice in a measurable amount.

The amount of stored energy released by phosphor molecules in a region exposed to stimulating radiation depends in part on the intensity of the radiation and how long the focal spot impinges on the region (referred to as dwell time). The intensity of the stimulating radiation may not be perfectly uniform across its cross-sectional area, for example, the intensity may exhibit a generally Gaussian shape similar to that illustrated by intensity profile 21 of focal spot 20', which decays exponentially from a maximum intensity $I_0$ at center 22. As a result, radiation impinging on an image recording medium may decrease in intensity as a function of the radial distance from the center of the focal spot. In response, the image recording medium will release proportionally fewer photons at locations further away from the center of the focal spot.

Figure 2C:
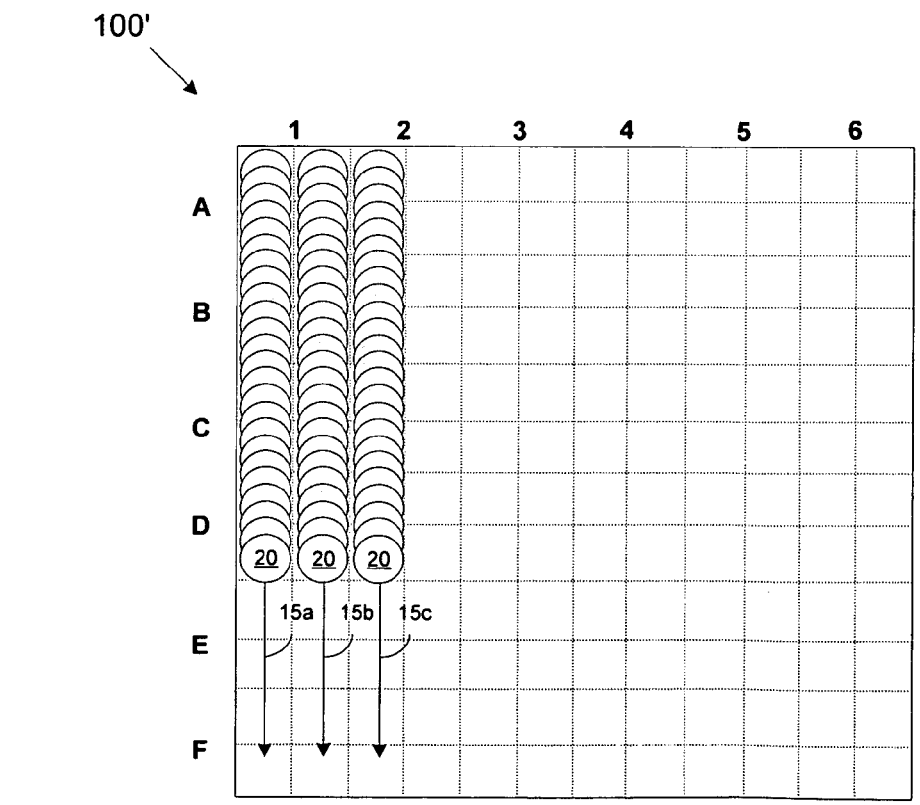
FIG. 2C illustrates a generally circular focal spot of a laser beam traversing a portion of an image recording medium in a raster YX scan in conventional fashion.

FIG. 2C illustrates a generally circular focal spot 20 of a laser beam traversing a portion of an image recording medium 100' in a raster YX scan in conventional fashion. It should be appreciated that the laser beam is being swept in a continuous fashion along the scan trace in the y-direction; first along scan trace 15a, then along scan trace 15b, 15c, etc. However, to facilitate the description of various concepts of the present invention, the beam is schematically illustrated as successive "snap-shots" in time as the focal spot traverses continuously along the scan trace in the direction indicated by the arrows of scan traces 15a–15c. It should be appreciated that the laser is continuously on between "snap-shots" in conventional CR image acquisition techniques.

As described above, a phosphor medium emits radiation proportional to the amount of energy stored by the phosphors and also in proportion to the intensity and dwell time of the impinging radiation. Accordingly, providing stimulating radiation along a scan trace performs essentially a convolution operation between the energy stored in the medium and the intensity of the laser beam. Convolution with a Gaussian operator has an averaging effect that may cause characteristic "blurring" of energy values stored in the phosphors of the image recording medium. The amount of resulting blur is related to the sigma ($\sigma$) of the Gaussian profile, that is, the blur decreases as the intensity profile of the focal spot approaches a Dirac or delta function (i.e., as sigma approaches zero). In addition, as the profile of the focal spot of the laser beam becomes more "impulse-like," the size of the regions of the image recording medium that may be stimulated in isolation may be reduced, thus increasing the resolution of the image.

As laser technology improves, the dimensions of a focal spot that can be produced may decrease and the profile of the laser beam may become more "impulse-like." However, a laser beam will produce a focal spot having some discrete dimensions even though the lower bound may change. In addition, the profile of the laser beam will continue to have a continuous decay. Accordingly, the resolution of the resulting image may be limited to some extent by the physical constraints imposed by generating a laser beam.

However, conventional image acquisition methods may further (and often more significantly) limit the resolution that may be achieved in obtaining CR images. As discussed above, continuous traversal of a laser along a scan trace provides for continuous detection signals output by the detector. These continuous detection signals must then be segmented and parsed to determine values of the individual pixels comprising an image. While various methods may be used to segment the continuous detection signals into intervals generally corresponding to individual pixel regions of the grid, the continuous detection signals necessarily include portions having information components from more than one pixel region. That is, as the laser beam continuously traverses a phosphor plate, there are intervals wherein the laser beam impinges simultaneously in two adjacent pixels regions of the logical grid. That is, energy is being released from locations considered logically to be part of separate and distinct pixels. Accordingly, the determination of a particular pixel intensity will be influenced by neighboring pixels. This cross influence has generally undesirable effects on the resolution and quality of the resulting image.

Figure 3A:
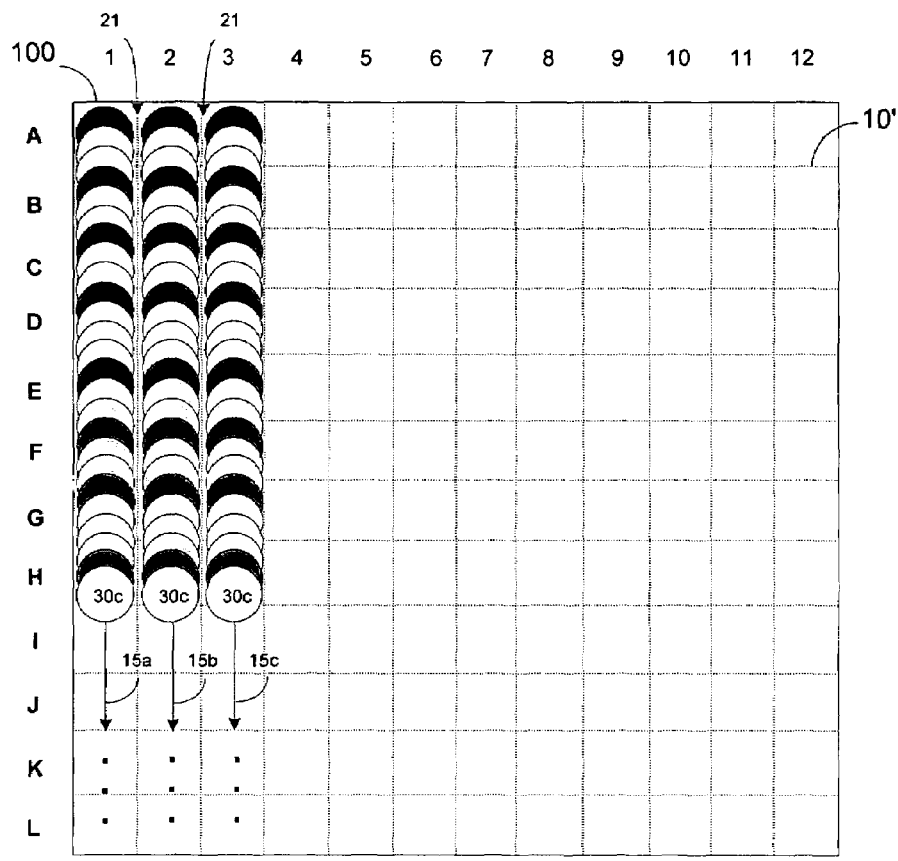
FIG. 3A illustrates a portion of an image recording medium scanned in a conventional raster YX order.
Figure 3B:
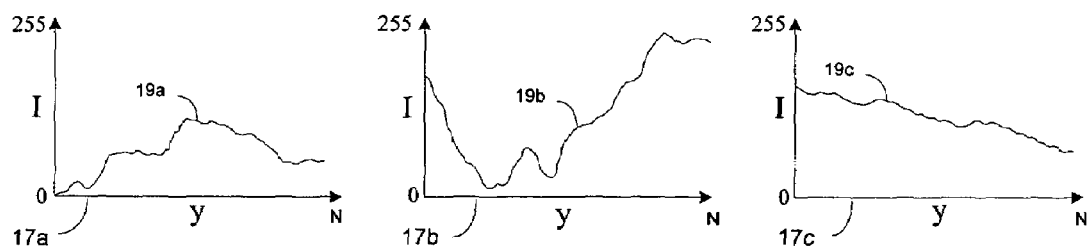
FIG. 3B illustrates plots showing detection signals indicating the amount of radiation emitted by the image recording medium in response to a laser beam provided along scan traces.

FIG. 3A illustrates a portion of an image recording medium 100 scanned in a conventional raster YX order. The portion of the image recording medium illustrated may be the first 12×12 region of a much larger medium. FIG. 3b illustrates plots 17a–17c showing detection signals 19a–19c indicating the amount of radiation emitted by the image recording medium in response to a laser beam provided along scan traces 15a–15c, respectively. For example, a detector may be employed to sense radiation emitted from the image recording medium in response to the impinging laser beam. The detector may be adapted to provide a detection signal indicative of an amount of radiation emitted from an image recording medium in response to stimulation. For example, a photomultiplier may be arranged to detect the photons released from a phosphor plate and respond by providing one or more detection signals proportional to the photonic energy released by the phosphor plate. Various photosensitive materials responsive to electromagnetic radiation in numerous arrangements may be suitable for measuring or detecting energy emitted by the image recording medium and providing a corresponding detection signal.

As shown in FIG. 3A, the laser excitation beam may be configured to produce a focal spot having dimensions that do not exceed that of a single pixel region of logical grid 10'. That is, the focal spot may be chosen such that when the center of the focal spot is in the center of a given pixel region, the intensity of the laser beam is essentially zero outside of the given pixel region, as illustrated by the narrow spaces 21 between the scan traces. By appropriately choosing the width of the focal point, each scan trace may be made distinct from all other scan traces with respect to locations of the image recording medium excited by the laser. Accordingly, dimensions of the focal spot may be chosen wherein the laser essentially does not excite phosphors of neighboring pixel regions in a direction against the scan trace.

The resulting detection signals 19a–19c resulting from distinct scan traces, therefore, may carry intensity information corresponding to a single pixel in a direction against the scan trace (i.e., in the x-direction in FIG. 3). As a result, the image information obtained against the scan trace may be substantially free from artifacts such as brightness modulation, smoothing effects, etc., that may result when portions of the focal spot occupy more than one pixel region simultaneously. Accordingly, the resolution in a direction against the trace may substantially follow the width of the focal spot.

In theory, the focal spot can be made arbitrarily small and the resolution in a direction against the scan trace may be limited only by the sampling theory. However, as discussed above, there is a practical lower limit on the size of the focal spot and on how closely the intensity profile of the laser beam can approximate a delta function. In contrast to the distinction that can be made between pixel regions in a direction against the scan trace, conventional scans may not be capable of exciting each pixel region in isolation in directions along the scan trace. FIG. 3A illustrates schematically a general problem associated with obtaining continuous detection signals along the scan trace in conventional scans.

As the laser beam traverses along a scan trace in a continuous fashion it will pass through locations where the focal spot excites phosphor molecules of the image recording medium that are located in adjacent pixel regions of the logical grid. In FIG. 3A, locations where the focal spot simultaneously impinges on two different pixel regions are denoted by lighter shading. As a result of this cross-influence, signals 19a–19c will carry information components resulting from photons being simultaneously released from adjacent pixel regions.

For example, when the laser beam is positioned as shown by "snap-shot" 30a, phosphors may be excited in portions of both pixel regions H1 and I1. Photons detected by a photomultiplier during that interval of time may have come from either region, with no way of making a distinction. That is, the respective contributions from simultaneously excited pixel regions may not be able to be distinguished and resolved. The result is that the intensity determined for a given pixel region may include information from neighboring pixels in a direction along the scan trace. This cross-influence between neighbors may degrade the image by causing loss in spatial resolution and/or reducing the quality of the resulting image.

Image degradation may be particularly evident when the focal spot is generally circular and the dimensions of the focal spot are chosen to obtain a desired resolution. That is, when the focal spot has dimensions essentially the same as or slightly smaller than a pixel region, as illustrated in FIG. 3, the focal spot may only infrequently occupy a single pixel region exclusively. For example, the focal spots in FIG. 3 that exclusively occupy a single pixel region (i.e., focal spots illustrated with darker shading) are outnumbered by at least 2 to 1 to locations of the focal spot wherein neighboring pixel regions are simultaneously stimulated. As a result, preponderant portions of resulting detection signals will carry cross-influence information.

Figure 4:
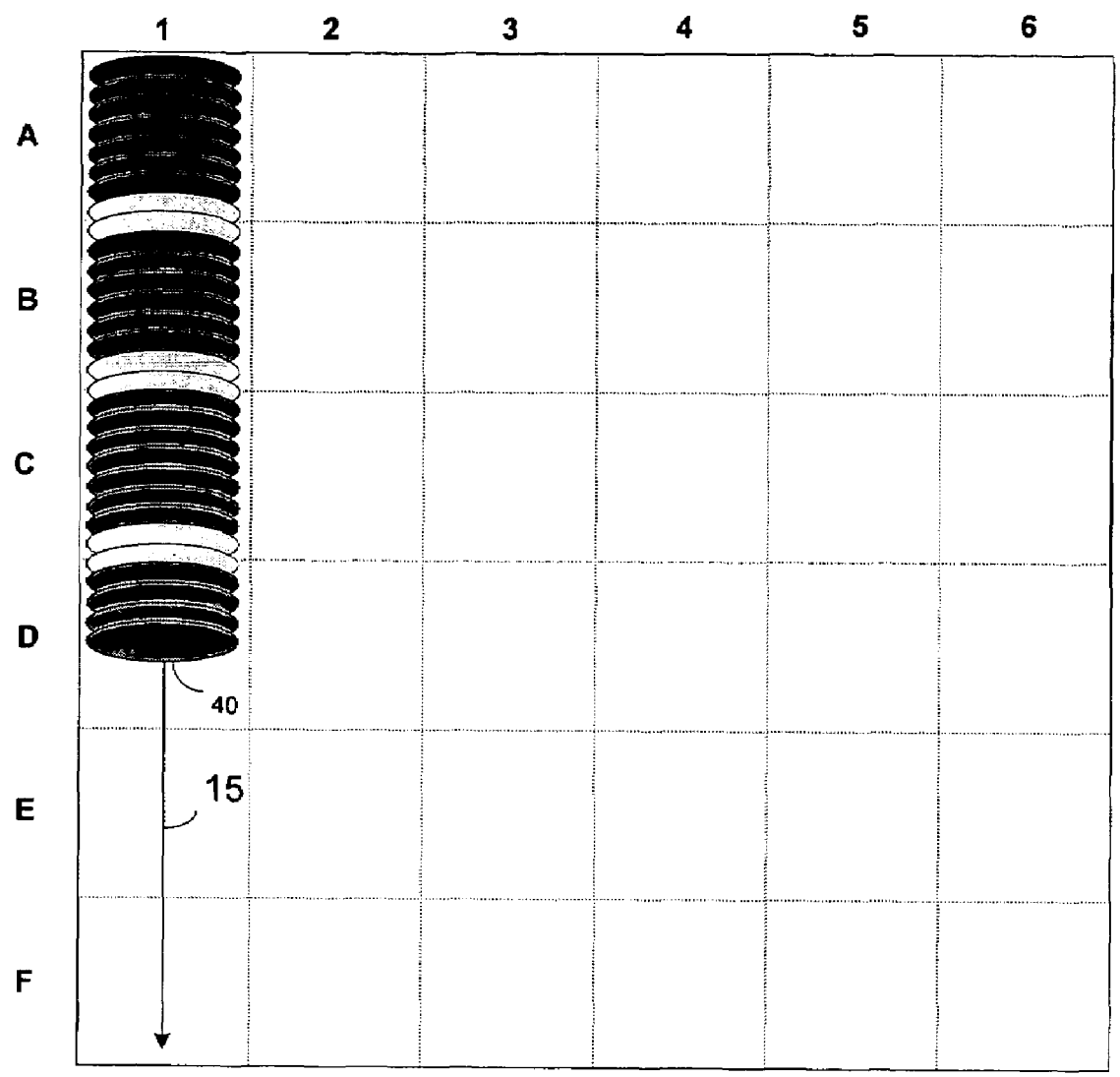
FIG. 4 illustrates a focal spot reduced to approximately 20% of the pixel length.

This result may be mitigated by reducing the size of the focal spot such that it has a dimension less than a single pixel length. The terms "pixel length" and "pixel width" will be used herein to describe a dimension of a pixel region along the scan trace and against the scan trace, respectively. For example, FIG. 4 illustrates a focal spot that has been reduced to approximately 20% of the pixel length. The reduced dimension in a direction along the scan trace results in fewer locations where the focal spot simultaneously excites neighboring pixels (as shown by the reduced number of focal spots having lighter shading as compared to FIG. 3). Accordingly, the resulting detection signals will contain fewer portions having cross influence components. However, while portions of a detection signal carrying information from adjacent pixel regions may be reduced, the effect may not be entirely eliminated when the laser beam is traversed in a continuous fashion.

Applicant has identified and appreciated that providing stimulating radiation in a pulsed rather than continuous fashion along a scan trace of an image recording medium may result in images having improved resolution and image quality. In particular, pulsing the stimulating radiation may facilitate reducing or eliminating excitation of the image recording medium in locations corresponding to more than one pixel region simultaneously. In particular, by pulsing the radiation source (e.g., a laser beam) on and off in a direction along the scan trace, the intervals wherein the focal spot occupies portions of more than one pixel region may be substantially reduced and/or eliminated.

The term "pulse" or "pulsed" in connection with a radiation source refers generally to providing radiation along a scan trace such that over at least one desired interval along a scan trace, the radiation does not impinge on the image recording medium. For example, a pulsed laser beam may alternately impinge and not impinge on an image recording medium along a given scan trace. The pulsing may take on any desired duty cycle to achieve a desired pattern of excitation, and may be achieved by charging and discharging the laser or by otherwise permitting and preventing stimulating radiation from impinging on the image recording medium.

Figure 5:
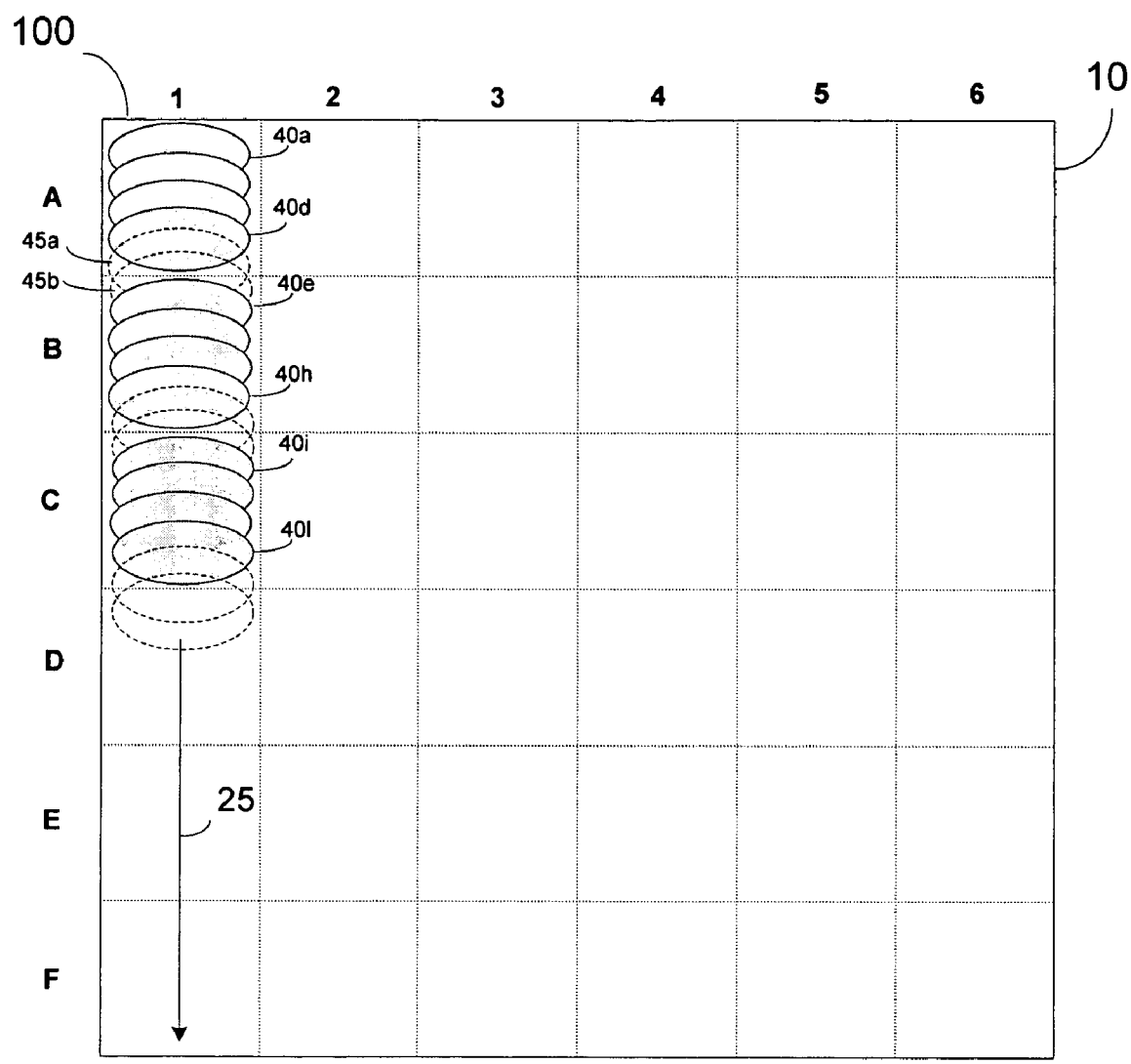
FIG. 5 illustrates an embodiment according to the present invention wherein an excitation or stimulating laser beam is pulsed on and off as it traverses along a scan trace.

FIG. 5 illustrates one embodiment according to the present invention, wherein an excitation or stimulating laser beam is pulsed on and off as it traverses along a scan trace. For example, a laser beam may produce a focal spot 40 having a generally elliptical shape with a minor axis that is substantially less than a pixel length of a desired resolution along the scan trace. The major axis may be chosen to be slightly less than a pixel width of a desired or intended resolution such that cross-influence does not occur in directions against the scan trace. When the laser beam is on, the resulting focal spot is illustrated as a solid and filled ellipse, for example, the focal spot at location 40a. When the laser beam is off, a dotted ellipse is shown to indicate the location where the focal spot would be provided if the laser beam were turned on or permitted to impinge on the image recording medium (e.g., phantom focal spot at location 45a and 45b).

In scanning along a scan trace 25, a laser beam may initially be on at location 40a, and may remain on as the beam traverses the medium until the leading edge of the focal spot reaches the end of pixel region A1 as shown by the focal spot at location 40d, after which the laser may be pulsed off. That is, the laser beam may continuously impinge on the image recording medium when the focal spot is located exclusively within a single pixel region. The laser beam may then be pulsed off during intervals wherein the focal spot would simultaneously impinge on more than one pixel region (e.g., phantom focal spots at locations 45a and 45b). In particular, the laser beam may remain off until the trailing edge of the focal spot passes into pixel region B1. When the laser beam is positioned such that the focal spot will again impinge exclusively in a single pixel region, the laser beam may be pulsed on as indicated by the focal spot at location 40e and may remain on as it traverses across pixel region B1 to a location 40h. This pulsing pattern may be repeated along the entirety of the scan trace. Each scan trace, in turn, may be acquired by the same method such that image information is obtained from an image recording medium using a pulsed radiation source.

By appropriately choosing the timing of the laser pulses, the scan may be arranged such that the laser is on whenever the focal spot is entirely within a single pixel region and off whenever portions of the focal spot are located in more than one pixel region. As a result, cross-influence may be reduced or entirely eliminated. For example, any given interval in detection signals generated by a detector from a pulsed traversal along a scan trace may carry only information from a single pixel region. Accordingly, since each portion of a detection signal may be resolved to a single pixel region, the resolution and quality of the resulting image may be improved.

Figure 6:
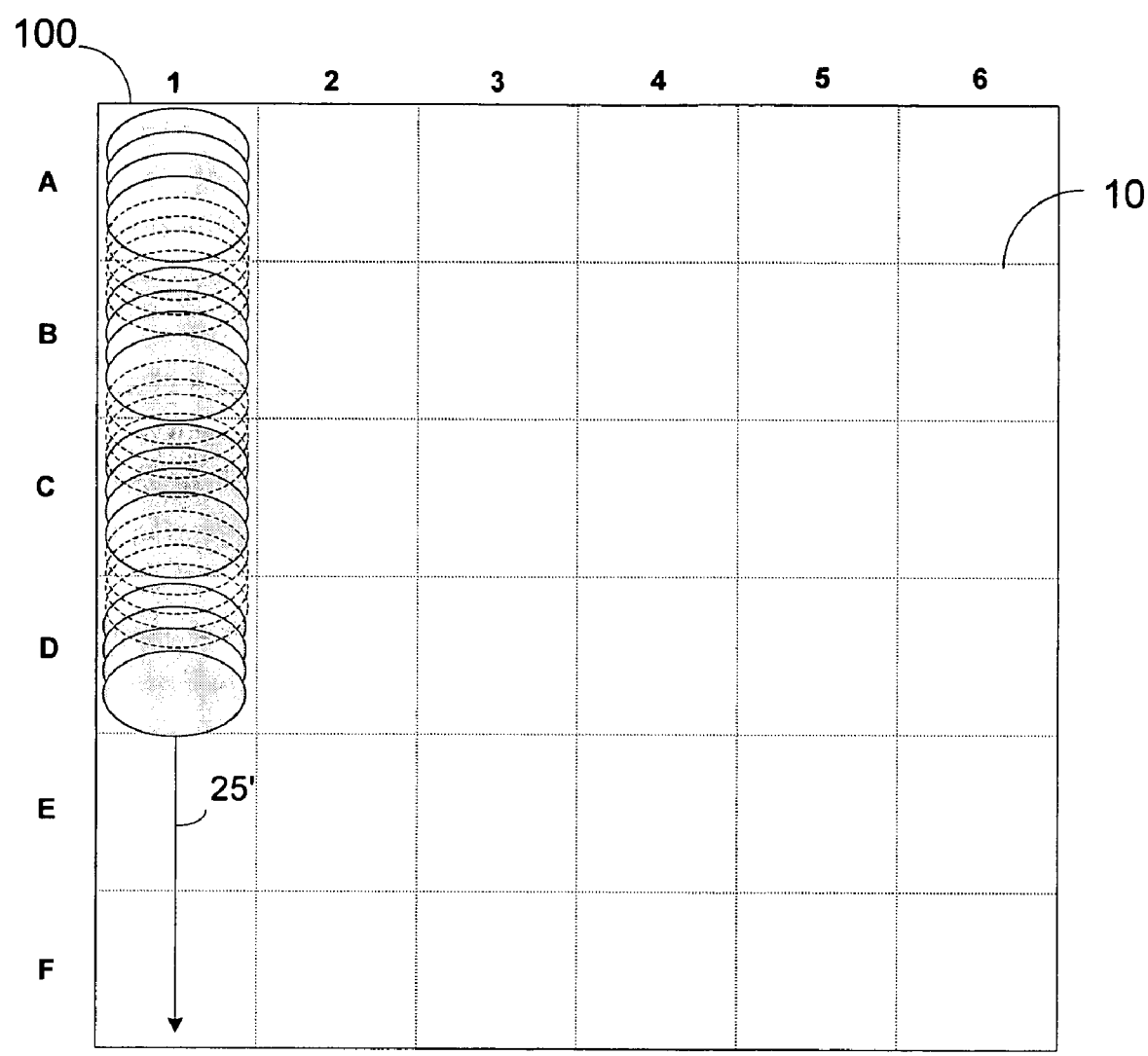
FIG. 6 illustrates an embodiment wherein the focal spot is chosen to have a minor axis that is approximately half of the pixel length of a desired resolution.

It should be appreciated that the invention is not limited to the dimensions and shapes of the focal spot of stimulating radiation described herein. Furthermore, the stimulating radiation may be chosen having any dimension relative to pixel regions of a desired resolution and is not limited to the sizes and shapes described in the embodiments herein. For example, FIG. 6 illustrates an embodiment wherein the focal spot is chosen to have a minor axis that is approximately half of the pixel length of a desired resolution. Accordingly, the stimulating radiation may be pulsed with approximately a 50% duty cycle as it is traverses along a scan trace.

The term "on" and "off" in connection with pulsing a radiation source indicates generally whether the radiation is or is not impinging on the image recording medium, respectively. In particular, the radiation source need not actually be turned on and off. For example, the radiation source may continually be generating radiation, while any of various mechanisms may be employed to block the radiation (i.e., prevent it from impinging on the image recording medium) during desired intervals to effectively turn the radiation source "off."

For example, a rotating disk generally opaque to stimulating radiation may be arranged in the path of the radiation. The disk may include openings or cut-outs that, as the disk rotates, permits the radiation to pass so as to impinge on the image recording medium at desired intervals. That is, the disk may be configured to alternately block and pass radiation to provide a desired "duty cycle." Various other methods and/or mechanisms may be suitable for alternately blocking and passing the radiation source such that pulsed radiation may be provided without having to physically charge and discharge the radiation source to turn it on and off.

Various aspects of the present invention have been illustrated in connection with scanning a planar surface, for example, a phosphor plate having a logical Cartesian grid superimposed on it. However, the various concepts may be employed for scanning an image recording medium having any of various geometries and the scanning path may be described in a curvilinear, cylindrical, spherical, radial or other suitable coordinate system. For example, a logical grid may be assigned to a variety of non-planar surfaces such as a generally cylindrical surface. Such a grid may be traversed by providing stimulating radiation across an arc of the cylindrical surface to obtain a scan trace. The stimulating radiation may then be translated along a longitudinal axis of the cylindrical surface and again traversed over an arc of the cylindrical surface along a subsequent scan trace.

In general, a two-dimensional image may be acquired by scanning an image recording medium over a range of a first dimension (i.e., along a scan trace) and then incrementing the scan one discrete unit (e.g., one pixel width) over a second dimension (i.e., against the scan trace). The range of the first dimension may again be traversed along a subsequent scan trace. Pulsed radiation along the scan trace made be employed to increase image quality independent of the geometry of the image recording medium, scan order, coordinate frame, or the specifics of the image acquisition equipment, as the aspects of the invention are not limited in this respect.

Figure 7:
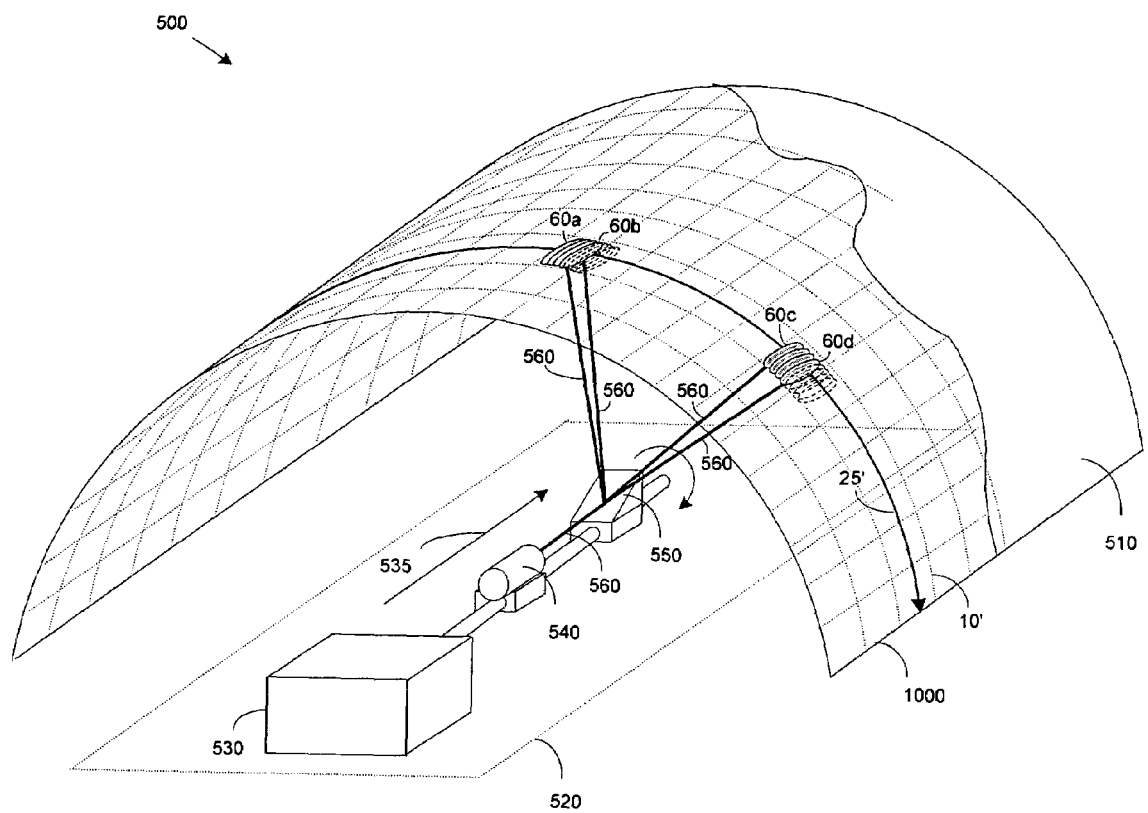
FIG. 7 illustrates an exemplary image acquisition apparatus for scanning an image recording medium that conforms to the inside of a cylindrical surface.

FIG. 7 illustrates an image acquisition apparatus 500 for scanning an image recording medium that conforms to the inside of a cylindrical surface. Scanning apparatus configured to acquire images from a cylindrical surface have, inter alia, the generally desirable characteristic that an image recording medium may be traversed using optical equipment adapted to provide radiation with a single degree of translational freedom and a single degree of rotational freedom (e.g., in contrast to two translational degrees of freedom for scanning a planar surface) and may result in simpler and more precise application of stimulating radiation. Image acquisition systems of this nature are described in U.S. Pat. No. 6,291,831, entitled "SCANNING APPARATUS," which is incorporated herein in its entirety.

Image acquisition apparatus 500 includes a cylindrical surface 510. An image recording medium, for example, a phosphor plate 1000 having been exposed to X-ray radiation may be conformally applied to the inside of cylindrical surface 510. Phosphor plate 1000 may be similar to the image recording medium described in connection with FIGS. 2-6. However, the phosphor layer of plate 1000 may be applied to a flexible substrate such that the plate may be conformed to various shapes and surfaces such as cylindrical surface 510.

The phosphor plate is scanned via scanning components arranged internal to cylindrical surface 510. Scanning components 520 include a stepper motor 530, laser source 540 and reflective surface 550. The laser source may be adapted to provide a laser beam 560 in a direction essentially parallel to axis 535 such that it impinges on reflective surface 550. The reflective surface then reflects laser beam 560 off axis 535 such that it impinges on the phosphor plate 1000. For example, reflective surface 550 may be a mirror set at a 45° angle with respect to axis 535, or may be implemented as a pentaprism. However, any reflective surface may be used, as the aspects of the invention are not limited in this respect. Any surface, component or combination of components capable of directing stimulating radiation to impinge on an image recording medium may be suitable.

The image recording medium may be traversed by rotating the reflective surface 550 such that the laser beam impinges in an arc over a range of a first dimension of image recording medium 1000. For example, an exemplary arc is illustrated by scan trace 25'. When the beam has traversed a desired arc, the laser beam and reflective surface may be translated one pixel width along axis 535 by the stepper motor and the reflective surface again rotated to provide the laser beam across an arc of the image recording medium along a subsequent scan trace. The rotation about axis 535 and the translation along axis 535 may functionally perform the scanning equivalent of a raster scan of a planar image recording medium, to the extent that the image recording medium is adequately traversed. It should be appreciated that traversal of the phosphor plate may be similarly achieved by performing the linear motion (i.e., along axis 535) by translating the image recording medium and/or cylindrical surface instead of translating the scanning components.

To improve the quality and resolution of a resulting image, image acquisition system 500 may be adapted to apply stimulating radiation in pulses rather than continuously in order to reduce cross-influence components in the image information. Accordingly, laser source 540 may be configured to pulse on and off as it traverses along a scan trace. For example, laser source 540 may be coupled to electronic circuitry, for example, a microprocessor that coordinates the pulsing of the laser beam at desired intervals. Alternately, a blocking mechanism (not shown) may be included to alternately block and pass radiation at desired intervals.

In FIG. 7, portions of the pulsed laser pattern along scan trace 25' are illustrated. The pattern includes controlling the application of laser beam 560 such that it impinges on the imaging plate 1000 at times when the focal spot 60 is located entirely or substantially within a single pixel region. For example, when the focal spot is located at location 60*a*, the laser beam is allowed to impinge on the imaging plate. The laser beam may continue to impinge on the imaging plate as it traverses along scan trace 25' up to and including location 60*b*, after which the laser beam is prevented from impinging on the image plate (i.e., pulsed off) until laser beam 560 is again positioned entirely within a single pixel region. The filled in ellipses (indicating an impinging or "on" laser beam) and the dotted ellipses (indicating a non-impinging or "off" laser beam) at locations starting at 60*c* show that the pulse pattern is repeated along the entire length of scan trace 25'.

As described in the foregoing, the laser may be focused and shaped to any desired dimension relative to pixel regions of an intended resolution and the pulses may be timed such that radiation only impinges on the image recording medium when the focal spot is essentially located within a single pixel region. As a result, radiation emitted from the image recording medium in response to the laser may be detected and resolved to a single pixel region of an applied grid, thus improving the resolution and quality of the resulting image.

Figure 8:
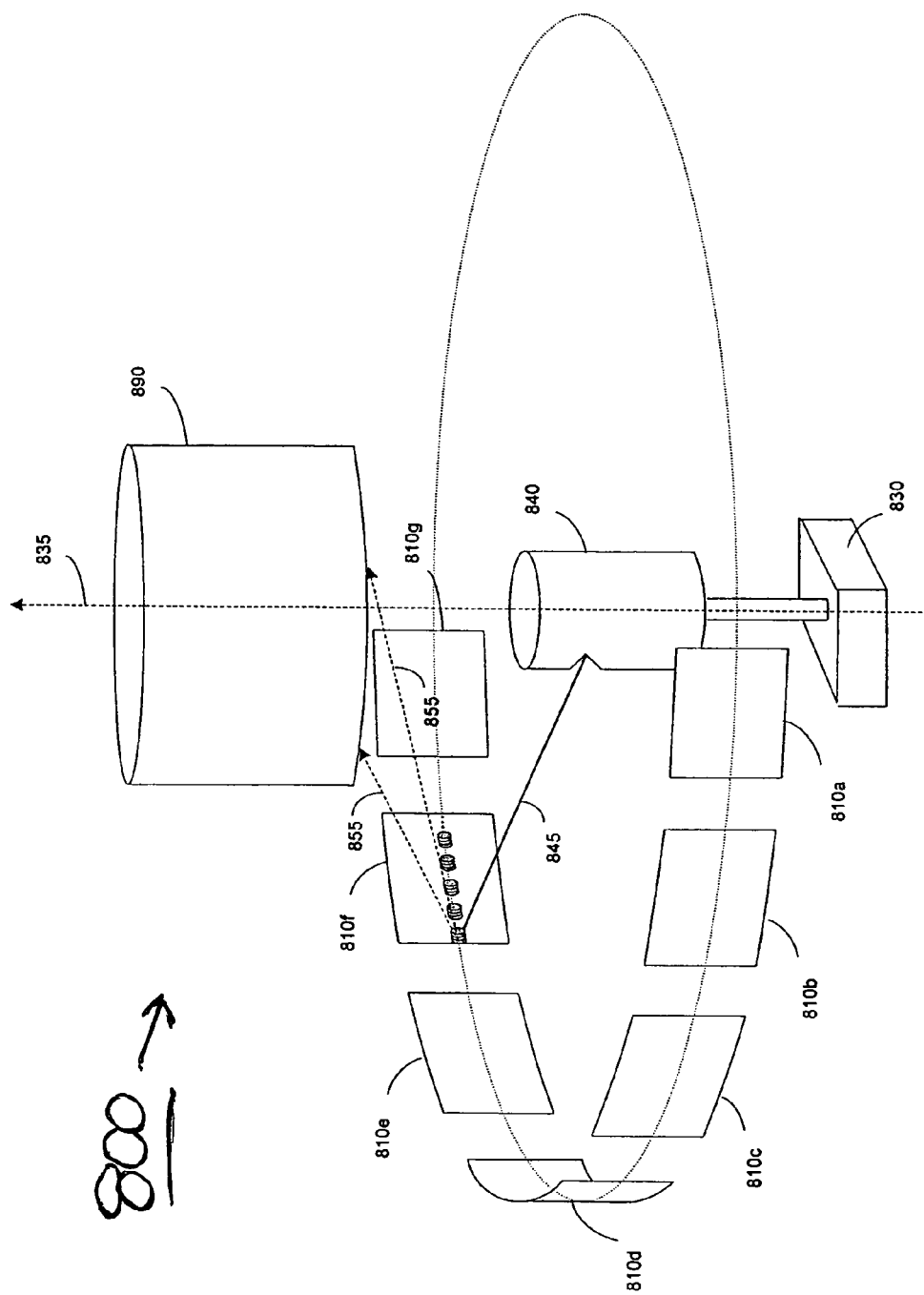
FIG. 8 illustrates a pulsed laser image acquisition method in the context of a dental CR scanner, in accordance with one embodiment of the present invention.

It should be appreciated that methods of pulsed radiation may be used in the context of both medical and dental CR applications. FIG. 8 illustrates a pulsed laser image acquisition method in the context of a dental CR scanner, in accordance with one embodiment of the present invention. The scanning apparatus 800 illustrated in FIG. 8 is adapted to scan one or more phosphor plates 810. For example, phosphor plates 810 may be plates generally sized for use in dental applications such as oral X-rays. CR scanner 800 is adapted to scan one or more phosphor plates positioned circumferentially about optical component 840. Optical component 840 may be any device or combination of devices adapted to provide stimulating radiation in a cylindrical arc such that it impinges on the one or more phosphor plates positioned for scanning. A photomultiplier tube 890 may be provided to detect stimulated radiation emitted from the phosphor plates in response to a laser beam provided by optical component 840. A controller 830 is configured to control the scanning path of the stimulated radiation and to control a pulsing pattern of the laser beam.

Phosphor plates 810*a*–810*g* may be held in place by a support or holder adapted to initially place the plates in a desired alignment with the optical component. For example, one or more slots may be provided around the circumference of the apparatus such that when a phosphor plate is inserted into the slot, the phosphor plate flexes to a generally cylindrical shape and is positioned for scanning. Accordingly, various arrangements may be possible such that a desired surface of one or more phosphor plates may be scanned. For example, optical component 840 may be adapted to rotate about and translate along axis 835 to provide successive arcs of stimulating radiation to the phosphor plates. Alternately, optical component 840 may be controlled to provide the rotational degree of freedom about axis 835 while the translational degree of freedom along axis 835 is provided by transporting the one or more phosphor plates in a direction parallel to axis 835, for example, by the use of one or more conveyors or rollers.

Controller 830 may be adapted to cause optical component 840 to provide stimulating radiation along any desired scan path. For example, optical component 840 may include one or more reflective surfaces that, when rotated, direct radiation outward in an arc about axis 835. Controller 830 may control the speed and/or direction of the rotation of the one or more reflective surfaces. Controller 830 may be a microprocessor capable of executing one or more programs that control optical component 840 along a desired scan path, for example, by controlling one or more motors. Optical component 840 may include one or more radiation sources, or any combination of components arranged to provide stimulating radiation to phosphor plates that have been inserted in a position for scanning.

Controller 840 may be further adapted to pulse the laser beam 845 provided by optical component 840 as it traverses over surfaces of the one or more phosphor plates. FIG. 8 schematically shows a pulsed laser pattern performed by controller 830 and optical component 840 to scan along a scan trace of phosphor plate 810*f*. In particular, the elliptically shaped focal spots indicate the positions where the laser beam is permitted to impinge upon a surface of imaging plate 810*f*. The spaces in between similarly denote intervals along the scan trace where the laser beam is prevented from impinging upon the surface of the phosphor plate.

It should be appreciated that the pulsing pattern indicated by the elliptical focal spots are not drawn to scale and simply indicate the fact that the laser beam is provided in a pulsed manner in a direction along the scan trace. The pulsing pattern may be repeated across any number of the multiple phosphor plates inserted into the imaging apparatus. It should be appreciated, that the pulsing pattern illustrated in FIG. 8 is merely exemplary and any pulsing pattern may be used. For example, any desired duty cycle may be used to achieve a pulsing pattern that reduces cross influence artifacts in the detection of stimulated radiation and conversion into a digital image.

It should be appreciated that since laser beam 845 may only be allowed to impinge on the phosphor plates when it is located entirely within a single pixel region, stimulated radiation 855 emitted from the phosphor plate in response to the laser beam and detected by photomultiplier tube 890 may be resolved to the exclusive pixel region from which it emanated. Accordingly, cross influence artifacts generated by exciting multiple pixel regions simultaneously may be reduced or eliminated.

Applicant has further recognized and appreciated that providing a pulsed radiation source may facilitate calibrating image information components of detection signals produced by detecting radiation emitted from an image recording medium. It should be appreciated that scanning is preferably conducted in an enclosure that generally prevents unintended radiation from impinging on the image recording medium. For example, image acquisition system 500 in FIG. 7 may be substantially enclosed such that spurious radiation (e.g., such as ambient light) does not release information from the image recording medium. Similarly, spurious radiation may also cause the detector to register detection signals that do not correspond to image information. However, even in an enclosed apparatus, some spurious radiation may be present.

The term "spurious radiation" refers generally to any radiation in the image acquisition environment that is generally not intended to be present. Spurious radiation may result from various sources including ambient light, the stimulating radiation source, unintentional excitation of the imaging plate, the exponential emission characteristics of an excited phosphor, etc. Spurious radiation may impinge on a detector of the image acquisition system and register as a portion of a detection signal. During scanning, portions of the detection signal resulting from spurious radiation in the environment, referred to as environmental information, may not be distinguishable from image information. The presence of environmental information manifests as noise in the resulting image.

Applicant has identified and appreciated that by providing pulsed radiation, the environmental information may be measured and removed from the detection signal to calibrate the image information. For example, during intervals wherein the stimulating radiation source is off (i.e., when the imaging plate is not intentionally being excited), any non-zero detection signal from the detector may indicate the presence and the amount of spurious radiation in the environment. Accordingly, the environmental information caused by spurious radiation that registers during "off" intervals may be subtracted or otherwise used to modify the detection signal. As a result, generally undesirable environmental information may be removed from the detection signal to increase the signal to noise ratio (SNR) of the image acquisition process.

In addition, spurious radiation may result from secondary stimulation of the image recording medium. Secondary stimulation is caused by reflection of the stimulating radiation by the image recording medium. For example, when a laser beam impinges on a phosphor lattice the energy in the region of the focal point, not all of the laser's energy is absorbed by the phosphors to cause the desired fluorescence. Some of the laser's energy is reflected by the medium and caused to interact with phosphor molecules outside the intended focal region of the laser. This reflected energy causes some phosphor molecules to fluoresce in unintended regions of medium. The effects of such unintended stimulation are two-fold.

First, the stimulated radiation emitted from unintended regions is effectively added as noise to the true signal emitted from the focal area. Second, the unintended stimulation essentially "steals" energy stored in the peripheral regions, eroding the signal strength when those regions become the intended target of excitation. The second effect is often referred to as the accumulated erosion effect. Applicant has appreciated that by pulsing the laser the amount of unintended stored in the peripheral regions, the accumulated erosion effect is reduced. For example, consider a pulse laser beam having a duty cycle of 50%. When the laser is off, the phosphor medium does not experience any accumulated erosion, and will therefore be reduced by half.

It should be appreciated that various aspects of providing pulsed radiation to acquire an image from an image recording medium may be applied to any of a variety of image acquisition apparatus. Concepts of pulsed radiation acquisition are not limited to any type, arrangement or combinations of components comprising an image acquisition device, nor is it limited to the size or shape of the image recording media. Any apparatus capable of providing radiation to excite an image recording medium is intended to be within the scope of the invention.

The above-described embodiments of the present invention can be implemented in any of numerous ways. For example, laser pulsing may be implemented in hardware, software or a combination of both. It should be appreciated that any component or collection of components that perform the functions described above can be generically considered as one or more controllers that control the above-discussed function. The one or more controllers can be implemented in numerous ways, such as with dedicated hardware, or with general purpose hardware (e.g., one or more processor) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. In particular, laser pulsing concepts can be used in any variety of image acquisition device and are not limited to the devices described in the illustrative embodiments herein.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method of scanning an image recording medium that has been exposed to x-ray radiation, the method comprising: providing first radiation along a plurality of scan traces over a surface of the image recording medium such that the first radiation does not impinge on the image recording over at least one interval along each of the plurality of scan traces, wherein the image recording medium emits second radiation in response to the first radiation, and wherein the method further comprises an act of providing detection signal indicative of an amount of second radiation emitted from the image recording medium, and wherein portions of the detection signal resulting from intervals wherein the first radiation is caused to impinge on the image recording medium correspond to image information and portions of the detection signal resulting from intervals wherein the first radiation is prevented from impinging on the image recording medium correspond to environmental information.

2. The method of claim 1, wherein the first radiation is a laser beam, the method further comprising an act of focusing the laser beam such that it produces a focal spot having a first dimension in a direction along the scan trace.

3. The method of claim 2, wherein the act of focusing the laser beam includes an act of focusing the radiation such that the first dimension of the focal spot is substantially less than the pixel length of the plurality of pixel regions.

4. The method of claim 3, wherein the act of focusing the radiation includes an act of focusing the radiation such that the first dimension is less than 75% of the pixel length.

5. The method of claim 4, wherein the act of pulsing the radiation source includes an act of pulsing the radiation source with at least a 50% duty cycle.

6. The method of claim 5, wherein the act of pulsing the radiation source includes an act of pulsing the radiation source with less than a 75% duty cycle.

7. The method of claim 6, wherein the act of focusing the radiation includes an act of focusing the radiation such that the first dimension of the focal spot is less than half of the pixel length.

8. The method of claim 1, further comprising an act of calibrating the image information based, at least in part, on the environmental information.

9. An image acquisition apparatus comprising:
a radiation source adapted to provide first radiation;
a support adapted to position an image recording medium in a proximate relationship with the radiation source;
at least one controller coupled to the radiation source, the at least one controller adapted to control the radiation source such that the first radiation is provided to the image recording medium along a plurality of scan traces such that the first radiation does not impinge on the image recording medium over at least one interval along each of the plurality of scan traces; and
a detector adapted to detect, when present, second radiation emitted from the image recording medium in response to the first radiation, and to provide at least one detection signal indicative of the amount of second radiation detected,
wherein portions of the at least one detection signal resulting from intervals wherein the first radiation is caused to impinge on the image recording medium correspond to image information and portions of the at least one detection signal resulting from intervals wherein the first radiation is prevented from impinging on the image recording medium correspond to environmental information.

10. The image acquisition apparatus of claim 9, wherein the radiation source is configured to cause, in alternation, the first radiation to impinge on the image recording medium and prevent the first radiation from impinging on the image recording medium in a pattern along the plurality of scan traces.

11. The image acquisition apparatus of claim 9, wherein the controller is further adapted to control the laser source such the first radiation is provided to each of a plurality of pixel regions that form a grid logically applied to the image recording medium, the plurality of pixel regions having a pixel length in a direction along each of the scan traces and a pixel width in a direction against the plurality of scan traces.

12. The image acquisition apparatus of claim 11, wherein the controller is adapted to control the radiation source such that that the first radiation is applied sequentially to the plurality of pixel regions of the logical grid.

13. The image acquisition apparatus of claim 12, wherein the controller is adapted to control the radiation source such that the first radiation impinges on the image recording medium along the plurality of scan traces when the first radiation is located essentially within a single one of the plurality of pixel regions and prevents the first radiation from impinging on the image recording medium in locations along the plurality of scan traces when the first radiation would impinge on more than one of the plurality of pixel regions simultaneously.

14. The image acquisition apparatus of claim 11, wherein the controller is adapted to pulse the radiation source along the plurality of scan traces.

15. The image acquisition apparatus of claim 14, wherein the controller is adapted to pulse the radiation source by charging and discharging the radiation source.

16. The image acquisition apparatus of claim 14, wherein the controller is adapted pulse the radiation source by permitting and preventing the first radiation from impinging on the image recording medium.

17. The image acquisition apparatus of claim 14, wherein the radiation source is a laser source configured to produce a laser beam with a focal spot having a first dimension in a direction along the scan trace less than the pixel length of the plurality of pixel regions.

18. The image acquisition apparatus of claim 17, wherein the first dimension of the focal spot is less than 75% of the pixel length.

19. The image acquisition apparatus of claim 18, wherein the radiation source is configured to pulse with at least a 50% duty cycle.

20. The image acquisition apparatus of claim 19, wherein the radiation source is configured to pulse with less than a 75% duty cycle.

21. The image acquisition apparatus of claim 20, wherein the first dimension of the focal spot is less than half of the pixel length.

22. The image acquisition apparatus of claim 9, further comprising circuitry coupled to the at least one detection signal, the circuitry adapted to modify the image information based, at least in part, on the environmental information.

23. The image acquisition apparatus of claim 22, wherein the circuitry is further adapted to convert portions of the at least one detections signal into a plurality of pixel intensities corresponding to the plurality of pixel regions.

24. The image acquisition apparatus of claim 23, wherein each portion of the at least one detection signal corresponding to image information is converted into a single respective pixel intensity.

25. An image acquisition apparatus, comprising:
a radiation source adapted to provide first radiation to an image recording medium, the radiation source configured to be pulsed, in alternation, between an on interval and an off interval along a plurality of scan traces;
a detector adapted to detect second radiation emitted from the image recording medium in response to the first radiation, the detector configured to provide a plurality of detection signals corresponding to scanning along each of the plurality of scan traces, respectively; and
circuitry coupled to the detector, the circuitry adapted to convert each of the plurality of detection signals into a plurality of pixel intensities such that each portion of the plurality of detection signals resulting from on intervals is converted into a single respective pixel intensity,
wherein the circuitry is further adapted to convert portions of the plurality of detections signals resulting from off intervals is converted into environmental information and wherein the circuitry determines a value of the single respective pixel intensity based, at least in part, on the environmental information.

* * * * *